(12) United States Patent
Park et al.

(10) Patent No.: US 9,292,942 B2
(45) Date of Patent: Mar. 22, 2016

(54) IMAGE SIGNAL COMPENSATION APPARATUS AND LIQUID CRYSTAL DISPLAY INCLUDING THE SAME

(71) Applicant: Samsung Display Co., Ltd., Yongin (KR)

(72) Inventors: Bong-Im Park, Cheonan-si (KR); Bong-Ju Jun, Cheonan-si (KR); Yun-Jae Kim, Asan-si (KR); Jae-Won Jeong, Seoul (KR); Yong-Jun Choi, Cheonan-si (KR); Dong-Beom Cho, Asan-si (KR); Woo-Jin Jung, Seoul (KR); Kang-Hyun Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 200 days.

(21) Appl. No.: 14/048,478

(22) Filed: Oct. 8, 2013

(65) Prior Publication Data

US 2014/0035941 A1 Feb. 6, 2014

Related U.S. Application Data

(63) Continuation of application No. 12/467,775, filed on May 18, 2009, now abandoned.

(30) Foreign Application Priority Data

Jun. 2, 2008 (KR) .................. 10-2008-0051729

(51) Int. Cl.
*G09G 5/10* (2006.01)
*G06T 11/00* (2006.01)
*G09G 3/36* (2006.01)

(52) U.S. Cl.
CPC ............ *G06T 11/001* (2013.01); *G09G 3/3611* (2013.01); *G09G 2320/0252* (2013.01); *G09G 2340/02* (2013.01); *G09G 2340/16* (2013.01); *G09G 2360/18* (2013.01)

(58) Field of Classification Search
None
See application file for complete search history.

(56) References Cited

U.S. PATENT DOCUMENTS 7,688,299 B2 3/2010 Park et al.
2001/0038372 A1 11/2001 Lee (Continued)

FOREIGN PATENT DOCUMENTS

KR 10-2006-0003610 1/2006
KR 10-2008-0026406 3/2008

OTHER PUBLICATIONS

McCathney "A Liquid Display Response Time Compensation feature Integrated into an LCD Panel Timing Controller", SID 03 Digest p. 1350-1355, 2003.*

(Continued)

*Primary Examiner* — Yingchun He
(74) *Attorney, Agent, or Firm* — H.C. Park & Associates, PLC

(57) ABSTRACT

Provided are an image signal compensation apparatus and a liquid crystal display (LCD) including the same. The image signal compensation apparatus includes a lookup table (LUT) and an image signal compensation unit. The LUT includes reference data that corresponds to each combination of first and second reference gray levels and is arranged in a matrix. The image signal compensation unit receives first and second image signals, receives reference data corresponding to the first and second image signals from the LUT, and compensates the second image signal using the reference data. The reference data includes diagonal reference data located on a diagonal line in the matrix, and at least one diagonal reference data from among the diagonal reference data has a different value from a corresponding combination of the first and second reference gray levels.

23 Claims, 7 Drawing Sheets

(56) References Cited

U.S. PATENT DOCUMENTS

2003/0210217 A1  11/2003  Lee
2004/0041767 A1  3/2004  Sugino
2006/0044242 A1  3/2006  Park et al.
2006/0061828 A1  3/2006  Park
2006/0267893 A1  11/2006  Kim et al.
2008/0069479 A1  3/2008  Park et al.

OTHER PUBLICATIONS

Non-Final Office Action issued on Jan. 6, 2012 in U.S. Appl. No. 12/467,775.

Non-Final Office Action issued on May 25, 2012 in U.S. Appl. No. 12/467,775.

Final Office Action issued on Oct. 2, 2012 in U.S. Appl. No. 12/467,775.

Non-Final Office Action issued on Mar. 11, 2013 in U.S. Appl. No. 12/467,775.

Notice of Allowance issued on Jul. 8, 2013 in U.S. Appl. No. 12/467,775.

Decision of Grant dated Oct. 21, 2015, in Korean Patent Application No. 10-2008-0051729.

* cited by examiner a < b a > b a > b a < b

IMAGE SIGNAL COMPENSATION APPARATUS AND LIQUID CRYSTAL DISPLAY INCLUDING THE SAME

CROSS REFERENCE TO RELATED APPLICATIONS

This application is a continuation of U.S. patent application Ser. No. 12/467,775, filed on May 18, 2009 and claims priority from and the benefit of Korean Patent Application No. 10-2008-0051729, filed on Jun. 2, 2008, all of which are hereby incorporated by reference for all purposes as if fully set forth herein.

BACKGROUND OF THE INVENTION

1. Field of the Invention

The present invention relates to an image signal compensation apparatus and a liquid crystal display (LCD) including the same.

2. Discussion of the Background

A conventional liquid crystal display (LCD) may include a first display substrate including a plurality of pixel electrodes, a second display substrate including a plurality of common electrodes, liquid crystal molecules that are injected between the first and second display substrates and have dielectric anisotropy, a gate driver to drive a plurality of gate lines, a data driver to output a data signal, and a timing controller to control the gate driver and the data driver.

The conventional LCD receives red (R), green (G), and blue (B) image signals from an external graphic source, and the R, G, and B signals are transmitted to a liquid crystal panel via the timing controller. Here, the timing controller uses dynamic capacitance compensation (DCC) in order to reduce the response time of the liquid crystal molecules.

Generally, a DCC value used to compensate an image signal is calculated by interpolating using reference data. However, when there is a discrepancy between the calculated DCC value and a compensation value that is actually required, the display quality of the conventional LCD may be reduced.

SUMMARY OF THE INVENTION

The present invention provides an image signal compensation apparatus that may enhance display quality.

The present invention also provides a liquid crystal display (LCD) that may enhance display quality.

Additional features of the invention will be set forth in the description which follows, and in part will be apparent from the description, or may be learned by practice of the invention.

The present invention discloses an image signal compensation apparatus including a lookup table (LUT) and an image signal compensation unit. The LUT includes reference data that corresponds to combinations of first and second reference gray levels and is arranged in a matrix. The image signal compensation unit receives first and second image signals, receives reference data corresponding to the first and second image signals from the LUT, and compensates the second image signal using the reference data. The reference data includes diagonal reference data located on a diagonal line in the matrix, and at least one diagonal reference data from among the diagonal reference data has a different value from a corresponding combination of the first and second reference gray levels.

The present invention also discloses an LCD including a liquid crystal panel displaying an image, a timing controller to receive first and second image signals that are sequentially provided and to output a compensated image signal obtained by compensating the second image signal, and a data driver to receive the compensated image signal and to apply a data voltage corresponding to the compensated image signal to the liquid crystal panel. The timing controller includes an LUT and an image signal compensation unit. The LUT includes reference data that corresponds to combinations of first and second reference gray levels and is arranged in a matrix. The image signal compensation unit receives the first and second image signals, receives reference data corresponding to the first and second image signals from the LUT, and compensates the second image signal by using the reference data. The reference data includes diagonal reference data located on a diagonal line in the matrix, and at least one diagonal reference data from among the diagonal reference data has a different value from a corresponding combination of the first and second reference gray levels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
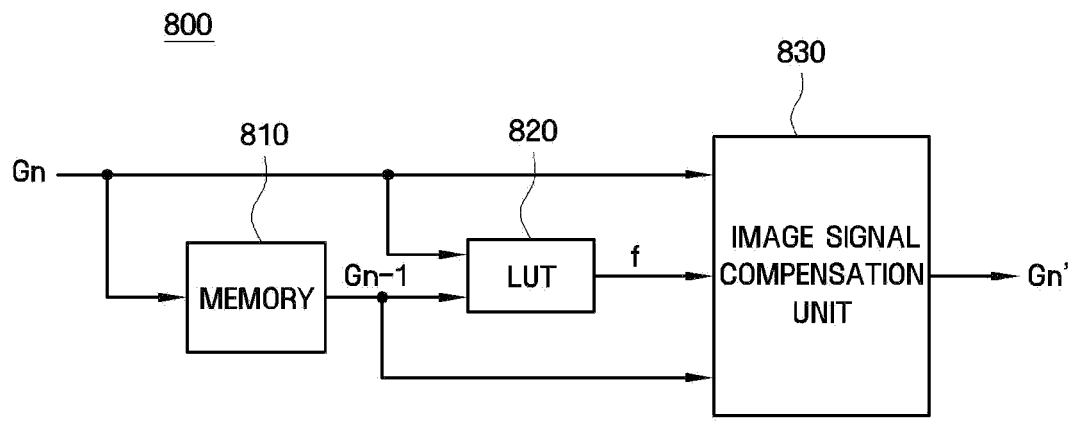
FIG. 1 is a block diagram of an image signal compensation apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
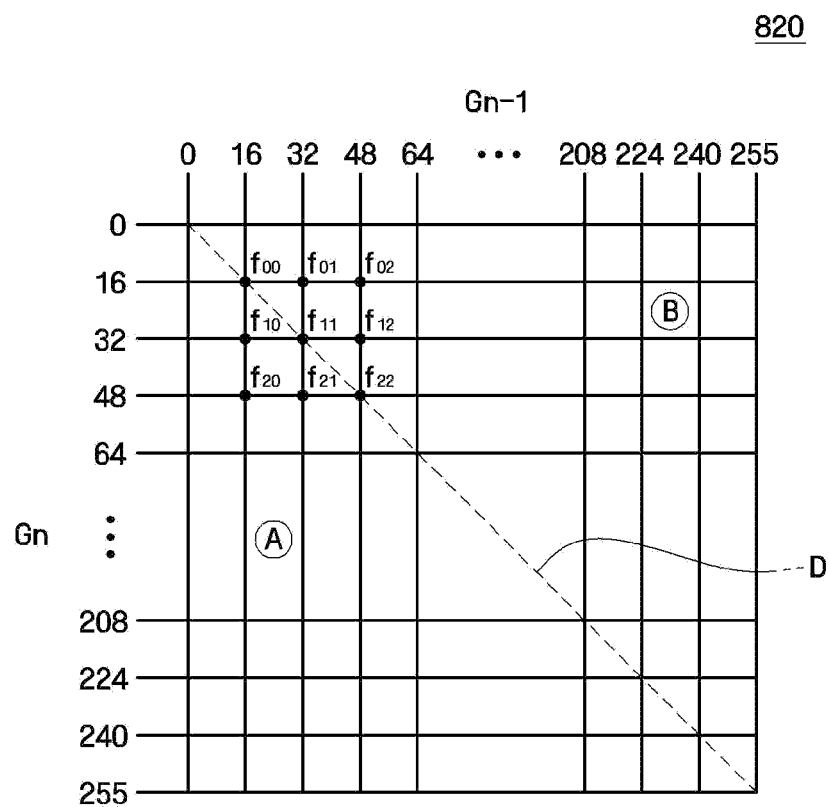
FIG. 2 is a conceptual diagram of a lookup table (LUT) of the image signal compensation apparatus shown in FIG. 1.

Hereinafter, an image signal compensation apparatus according to an exemplary embodiment of the present invention will be described with reference to FIG. 1, FIG. 2, FIG. 3A, FIG. 3B, FIG. 4A, FIG. 4B, FIG. 5, FIG. 6A, and FIG. 6B, and FIG. 7. FIG. 1 is a block diagram of an image signal compensation apparatus 800 according to an exemplary embodiment of the present invention. FIG. 2 is a conceptual diagram of a lookup table (LUT) 820 of the image signal compensation apparatus 800 shown in FIG. 1. FIG. 3A, FIG. 3B, FIG. 4A, and FIG. 4B are conceptual diagrams showing diagonal reference data of the LUT 820 shown in FIG. 2. FIG. 5 is a conceptual diagram showing the way in which an image signal compensation unit 830 of the image signal compensation apparatus 800 of FIG. 1 compensates an image signal using reference data.

Referring to FIG. 1, the image signal compensation apparatus 800 according to the present exemplary embodiment may include a memory 810, the LUT 820, and the image signal compensation unit 830.

The memory 810 may be a frame memory and may store an image signal received during each frame. Specifically, a first image signal G(n−1) and a second image signal Gn may be sequentially transmitted to the image signal compensation apparatus 800. During a current frame, the memory 810 may read the first image signal G(n−1), which was stored therein during a previous frame, and store the second image signal Gn.

The LUT 820 may include reference data "f" that corresponds to each combination of first and second reference gray levels and that is arranged in a matrix. When each of the first and second image signals G(n−1) and Gn is composed of $\alpha$ upper bits and $\beta$ lower bits, the first and second reference gray levels may correspond to upper bit values of the first and second image signals G(n−1) and Gn, respectively.

For example, when each of the first and second image signals G(n−1) and Gn is composed of 8 bits, the number of first or second reference gray levels corresponding respectively to the upper bits of the first or second image signal G(n−1) or Gn is 256. Thus, the number of combinations of the first and second reference gray levels of the first and second image signals G(n−1) and Gn is 256×256=65,536. Based on the assumption that the upper bits of the first and second image signals G(n−1) and Gn are the first and second reference gray levels, respectively, a compensation value, which is required to compensate an image signal and corresponds to each combination of the first and second reference gray levels, is set as the reference data f. Therefore, image signals may be compensated more efficiently in terms of time and space.

For example, when the number of upper bits of each of the first and second image signals G(n−1) and Gn is $\alpha$=4, the number of first or second reference gray levels corresponding respectively to the 4 upper bits of the first or second image signal G(n−1) or Gn is 17 (0, 16, 32, 48, 64, . . . , 208, 224, 240, 255). Accordingly, compensation values corresponding respectively to 17×17 combinations of the first and second reference gray levels may be stored in the LUT 820 as the reference data f. In addition, compensation values corresponding to combinations of gray levels other than the first and second reference gray levels may be calculated by, e.g., interpolation using the reference data f, which corresponds to the first and second image signals G(n−1) and Gn, and the lower bits of each of the first and second image signals G(n−1) and Gn.

The reference data f includes diagonal reference data that is located on a diagonal line in the matrix in which the reference data f is arranged. Specifically, the diagonal reference data refers to the reference data f corresponding to each combination of equal first and second reference gray levels. Therefore, the number of pieces of diagonal reference data may be equal to the number of first or second reference gray levels. However, the diagonal reference data may have a different value from the first and second reference gray levels corresponded to the diagonal reference data, which will be described below.

The image signal compensation unit 830 receives the first and second image signals G(n−1) and Gn, which are sequentially provided, and receives the reference data f, which corresponds to the first and second image signals G(n−1) and Gn, from the LUT 820. Then, the image signal compensation unit 830 compensates the second image signal Gn using the received reference data f. Here, the first image signal G(n−1) may be an image signal that was stored in the memory 810 during the previous frame. That is, the image signal compensation unit 830 may receive the first and second image signals G(n−1) and Gn and receive the reference data f from the LUT 820. Then, the image signal compensation unit 830 may compensate the second image signal Gn through interpolation, which uses the first and second image signals G(n−1) and Gn and the reference data f, and output a compensated second image signal Gn'. The compensated second image signal Gn' may be input to a data driver, and an image corresponding to the compensated second image signal Gn' may be displayed on a liquid crystal panel.

Referring to FIG. 2, the LUT 820 may store the reference data f that corresponds to each combination of the first and second reference gray levels. Here, the reference data f may be a dynamic capacitance compensation (DCC) value corresponding to each combination of the first and second reference gray levels.

The LUT 820 shown in FIG. 2 is based on 17×17 combinations of the first and second reference gray levels which may be made when the number of upper bits of each of the first and second image signals G(n−1) and Gn is four. The horizontal axis of the LUT 820 indicates a previous image signal, i.e., the first image signal G(n−1), and the vertical axis indicates a current image signal, i.e., the second image signal Gn. The 17×17 combinations shown in FIG. 2 are merely an example, and the present invention is not limited thereto. That is, when the number of upper bits of each of the first and second image signals G(n−1) and Gn is a, compensation values corresponding respectively to $(2^{\alpha}+1)\times(2^{\alpha}+1)$ combinations may be calculated and stored in the LUT 820.

Meanwhile, reference data located on the same line may have the same first or second reference gray level. For example, with respect to reference data $f_{11}$ that corresponds to a combination of a first reference gray level of 32 and a second reference gray level of 32, reference data $F_{01}$ and $F_{21}$ located on the same line in the direction of the vertical axis may have the same first reference gray level, and reference data $f_{10}$ and $f_{12}$ located on the same line in the direction of the horizontal axis may have the same second reference gray level.

Reference data (e.g., $f_{00}$, $f_{11}$, or $f_{22}$) located on a diagonal line D in the matrix is diagonal reference data, which has a value corresponding to each combination of equal first and second reference gray levels.

The LUT 820 may include a first region, e.g., a rising region A, in which the first reference gray levels of the first image signal G(n−1) are lower than the second reference gray levels of the second image signal Gn, and a second region, i.e., a falling region B, in which the first reference gray levels of the first image signal G(n−1) are higher than the second reference gray levels of the second image signal Gn. In this case, the LUT 820 may be divided into the rising region A and the falling region B by the diagonal line D.

Diagonal reference data will now be described in more detail with reference to FIG. 3A, FIG. 3B, FIG. 4A, and FIG. 4B. When a first reference gray level is "a" and when a second reference gray level is "a", diagonal reference data has a value corresponding to a combination of "a" and "b" (a≠b). That is, although diagonal reference data $f_{11}$ is located at a position defined by the combination of the first reference gray level of "a" and the second reference gray level of "a", it may have a value $f_{11}'$ corresponding to a modified combination of "a" and "b".

It will be assumed below that first and second reference gray levels correspond to the first and second image signals G(n−1) and Gn, respectively. Based on this assumption, a value of diagonal reference data corresponding to each combination of the first and second reference gray levels will be described. In addition, when the first reference gray level is "x" and when the second reference gray level is "y", a value corresponding to a combination of the first and second reference gray levels will be represented by [x, y].

Figure 3A:
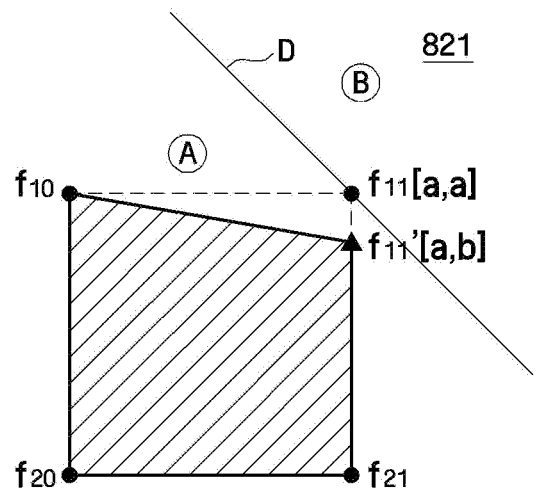
FIG. 3A, FIG. 3B, FIG. 4A, and FIG. 4B are conceptual diagrams of diagonal reference data of the LUT shown in FIG. 2.
Figure 3B:
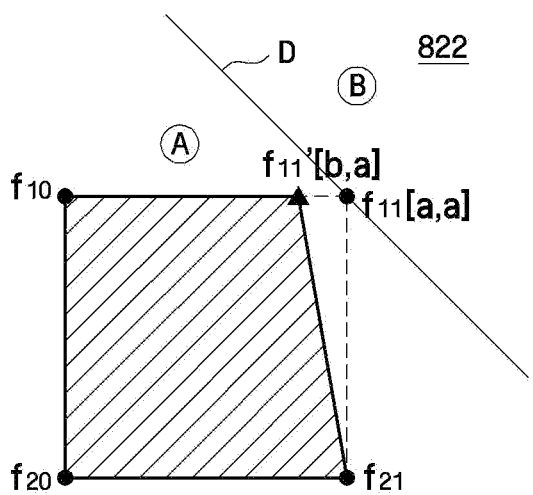

Referring to FIG. 3A and FIG. 3B, diagonal reference data $f_{11}$ on the diagonal line D of each LUT 821 and 822 may have a value $f_{11}'$ corresponding to a combination of the first and second reference gray levels that has been shifted toward the rising region A from the diagonal line D.

Specifically, referring to FIG. 3A, when each of first and second reference gray levels is "a", the diagonal reference data $f_{11}$ may have a value $f_{11}'$ corresponding to a combination [a, b] of a first gray level of "a", which is equal to the first reference gray level, and a second gray level of "b", which is higher than the second reference gray level. Alternatively, referring to FIG. 3B, the diagonal reference data $f_{11}$ may have a value $f_{11}'$ corresponding to a combination [b, a] of a second gray level of "a", which is equal to the second reference gray level, and a first gray level of "b" that is lower than the first reference gray level.

In this case, the difference between the gray level of "a" and the gray level of "b" may be less than an interval between adjacent reference gray levels. For example, the difference between the gray level of "a" and the gray level of "b" may be one.

According to one or more exemplary embodiments, a third reference gray level, which is adjacent to the first reference gray level is "c", and the absolute value of a difference between the gray levels of "b" and "a" is less than the absolute value of a difference between the gray levels of "c" and "a". In addition, a fourth reference gray level, which is adjacent to the second reference gray level is "d", and the absolute value of a difference between the gray levels of "b" and "a" is less than the absolute value of a difference between the gray levels of "d" and "a". For example, if the gray level of "a" is 32 and reference gray levels adjacent to the gray level of "a" are 16 and 48, then a determination can be made with respect to the gray level of "b". In this case, the absolute value of an interval between the gray level of "a" and each of the stated reference gray levels adjacent to the gray level of "a" is 16 because |32−16|=16 and |32−48|=16. As such, the value of the gray level of "b" is less than 16 to satisfy each of the above-noted conditions, i.e., |a−b|<|a−c| and |a−b|<|a−d|. The diagonal reference data $f_{11}$ may have a value corresponding to, e.g., a combination [32, 33] or [33, 32].

Here, values corresponding respectively to the combinations [a, b] and [b, a] may be measured values for the first and second image signals G(n−1) and Gn having the above first and second gray levels, respectively. That is, when the first image signal G(n−1) has a gray level of "a" or "b" and when the second image signal Gn has a gray level of "b" or "a", a compensation value required to compensate the second image signal Gn may be measured and stored as diagonal reference data.

Figure 4A:
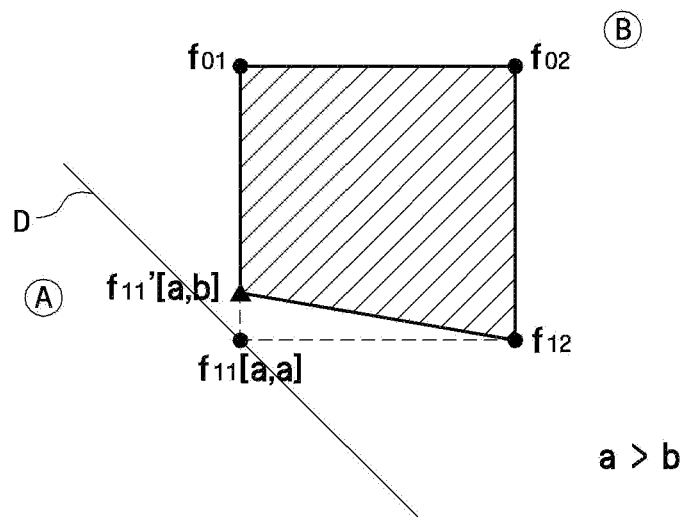
Figure 4B:
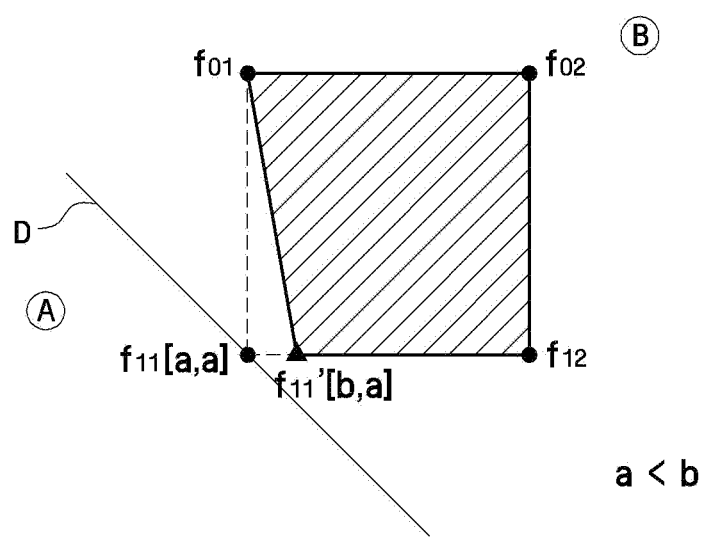
Figure 5:
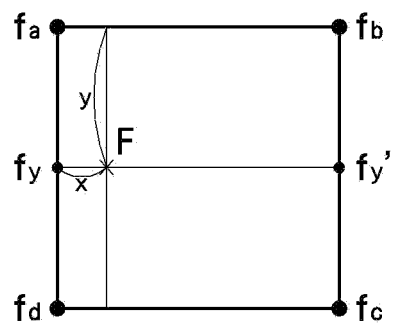
FIG. 5 is a conceptual diagram showing the way in which an image signal compensation unit of the image signal compensation apparatus of FIG. 1 compensates an image signal using reference data.

Referring to FIG. 4A and FIG. 4B, diagonal reference data $f_{11}$ on the diagonal line D of each LUT 823 and 824 may have a value $f_{11}'$ corresponding to a combination of the first and second gray levels which has been shifted toward the falling region B from the diagonal line D. The diagonal reference data $f_{11}$ in the falling region B of each LUT 823 and 824 may have a value obtained in a similar way to that for the rising region A of each LUT 821 and 822.

Therefore, referring to FIG. 4A, when each of the first and second reference gray levels is "a", the diagonal reference data $f_{11}$ may have a value $f_{11}'$ corresponding to a combination [a, b] of a first gray level of "a", which is equal to the first reference gray level, and a second gray level of "b", which is lower than the second reference gray level. Alternatively, referring to FIG. 4B, the diagonal reference data $f_{11}$ may have a value $f_{11}'$ corresponding to a combination [b, a] of a second gray level of "a", which is equal to the second reference gray level, and a first gray level of "b", which is higher than the first reference gray level.

In this case, the gray level of "b" may have a smaller value than an interval between adjacent reference gray levels. For example, the difference between the gray level of "a" and the gray level of "b" may be one.

That is, reference data (e.g. $f_{10}$, $f_{11}$, $f_{20}$, or $f_{21}$), which is used to calculate a compensation value required to compensate the second image signal Gn, may correspond to each combination of the first and second gray levels of the first and second image signals G(n−1) and Gn. Here, the diagonal reference data $f_{11}$ included in the reference data may have the value $f_{11}'$, which corresponds to the modified combination of "a" and "b", for example, instead of a compensation value corresponding to a combination of equal reference gray levels, "a" and "a".

Therefore, at least one diagonal reference data from among the diagonal reference data located on the diagonal line D in the matrix has a different value from a corresponding combination of the first and second reference gray levels. However, when a reference gray level corresponding to diagonal reference data has a limit value, e.g., a value of 0 or 255 of an 8-bit image signal, the limit value may be stored.

As described above, the matrix of the LUT 820 may be divided into the rising region A and the falling region B by the diagonal line D, and each reference data may have a value that belongs to the rising region A or the falling region B. Accordingly, each diagonal reference data may include at least two compensation values that are included in the rising region A and the falling region B, respectively.

Referring to FIG. 5, reference data corresponding to the first and second image signals G(n−1) and Gn may be received from the LUT 820, and the second image signal Gn may be compensated by interpolation using the reference data.

If the reference data received from the LUT 820 is fa, fb, fc, and fd and if a compensation value required to compensate an image signal is F, the second image signal Gn may be compensated by, for example, bi-linear interpolation. That is, the compensation value F may be given by Equation (1) below.

$$F=fy-x*(fy-fy'),\qquad(1)$$

where fy=fa+y*(fd−fa), and fy'=fb+y(fc−fb). Thus, Equation (1) may be summarized into F=fa+(fb−fa)*x+(fd−fa)*y+(fa+fc−fd)*x*y, where x and y indicate values obtained after the lower bits of the first and second image signals G(n−1) and Gn are divided by a block interval of $2^\beta$. Here, 0≤x<1, and 0≤y<1. Therefore, a compensation value required to compensate the second image signal Gn may be calculated by using the reference data, which corresponds to the first and second image signals G(n−1) and Gn.

The image signal compensation apparatus 800 according to the present exemplary embodiment may compensate the second image signal Gn more accurately since a plurality of diagonal reference data, which may be included in reference data corresponding to the first and second image signals G(n−1) and Gn, has a different value from a value exactly corresponding to a combination of the first and second reference gray levels.

Furthermore, the second image signal Gn may be compensated not only by bi-linear interpolation but also by various other methods, for example, triangular bi-linear interpolation. Triangular bi-linear interpolation will be described below with reference to FIG. 7.

Figure 6A:
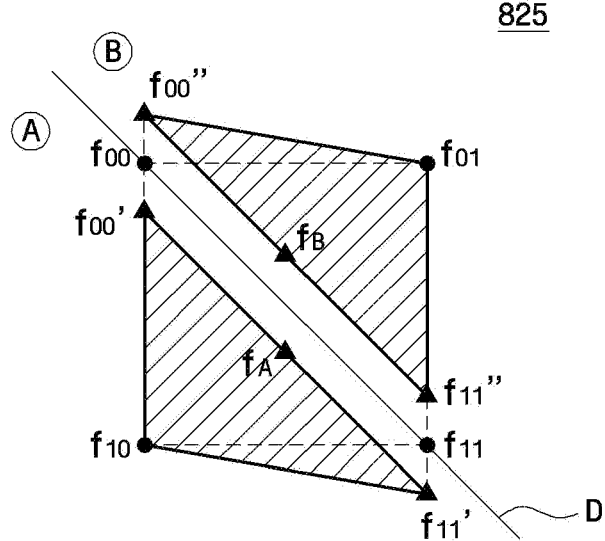
FIG. 6A and FIG. 6B are conceptual diagrams showing additional reference data of an image signal compensation apparatus according to another exemplary embodiment of the present invention.
Figure 6B:
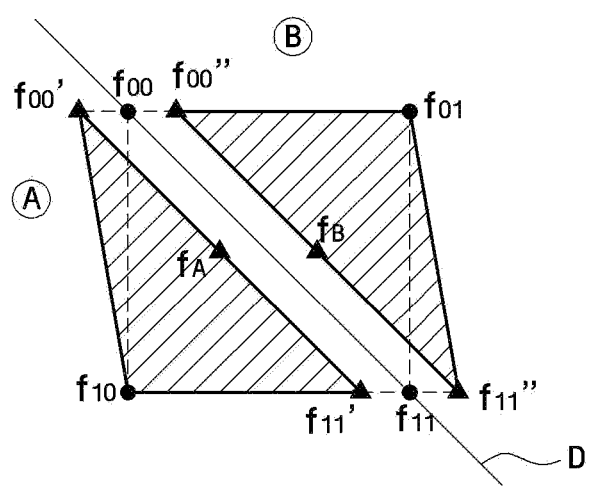
Figure 7:
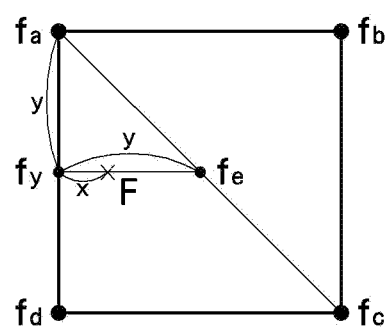
FIG. 7 is a conceptual diagram showing the way in which an image signal compensation unit of the image signal compensation apparatus according to another exemplary embodiment of the present invention compensates an image signal using the additional reference data.

Hereinafter, an image signal compensation apparatus according to another exemplary embodiment of the present invention will be described with reference to FIG. 6A, FIG. 6B, and FIG. 7. FIG. 6A and FIG. 6B are conceptual diagrams showing additional reference data of an image signal compensation apparatus according to another exemplary embodiment of the present invention. FIG. 7 is a conceptual diagram showing the way in which an image signal compensation unit of the image signal compensation apparatus according to the present exemplary embodiment compensates an image signal using the additional reference data.

The image signal compensation apparatus according to the present exemplary embodiment is different from the image signal compensation apparatus 800 according to the previous exemplary embodiment in that reference data includes additional reference data having different gray values for a combination of first and second gray levels.

Referring to FIG. 6A and FIG. 6B, first and second gray levels corresponding to additional reference data may be located between first and second reference gray levels corresponding to first diagonal reference data, which is adjacent to the additional reference data, and first and second reference gray levels corresponding to second diagonal reference data, which is also adjacent to the additional reference data.

Specifically, referring to FIG. 6A, reference data of a LUT 825 may include additional reference data $f_A$ and $f_B$ corresponding to combinations of the first and second gray levels in a rising region A and a falling region B, respectively.

The additional reference data $f_A$ may have a value corresponding to a position below a diagonal line D, that is, a combination of a first gray level of a first image signal G(n−1) and a second gray level of a second image signal Gn that is higher than the first gray level. The diagonal line D connects combinations of equal first and second gray levels. The horizontal axis of the LUT 825 indicates the first gray level of the first image signal G(n−1), and the vertical axis thereof indicates the second gray level of the second image signal Gn. Thus, the additional reference data $f_A$ may have a value corresponding to a combination of the first gray level of the first image signal G(n−1) and the second gray level of the second image signal Gn, which is higher than the first gray level of the first image signal G(n−1).

The additional reference data $f_B$ may also have a value corresponding to a position above the diagonal line D, which connects combinations of equal first and second gray levels. For example, the additional reference data $f_B$ may have a value corresponding to a combination of the first and second gray levels in the falling region B. That is, the additional reference data $f_B$ may have a value corresponding to a combination of the first gray level of the first image signal G(n−1) and the second gray level of the second image signal Gn, which is lower than the first gray level of the first image signal G(n−1).

Referring to FIG. 6B, reference data of a LUT 826 also includes additional reference data $f_A$ and $f_B$ that corresponds to combinations of the first and second gray levels in the rising region A and the falling region B, respectively. The additional reference data $f_A$ and $f_B$ may be calculated in a similar way to that of FIG. 6A.

However, the additional reference data $f_A$ may have a value corresponding to a combination of the second gray level of the second image signal Gn and the first gray level of the first image signal G(n−1), which is lower than the second gray level of the second image signal Gn. The additional reference data $f_B$ may have a value corresponding to a combination of the second gray level of the second image signal Gn and the first gray level of the first image signal G(n−1), which is higher than the second gray level of the second image signal Gn.

The diagonal line D that connects diagonal reference data may be defined as a first diagonal line. A second diagonal line may be defined as the first diagonal line shifted toward the rising region A, and a third diagonal line may be defined as the first diagonal line shifted toward the falling region B. In this case, the additional reference data $f_A$ or $f_B$ may have a gray value located on the second diagonal line or the third diagonal line.

More specifically, the diagonal line D in a matrix of the LUT 825 or 826 may be shifted in a vertical or horizontal direction such that the diagonal line D stays parallel to its previous position. When the diagonal line D is parallelly shifted by a distance that is less than an interval between reference gray levels, the additional reference data $f_A$ or $f_B$ may have a value corresponding to a combination of the first and second gray levels, which correspond to the shifted diagonal line D. Specifically, FIG. 6A shows a case where the diagonal line D is parallelly shifted in the vertical direction, and FIG. 6B shows a case where the diagonal line D is parallelly shifted in the horizontal direction.

At least one additional reference data may be included in each of the rising region A and the falling region B. In addition, the diagonal line D does not have to be parallelly shifted. That is, the additional reference data may be $f_A$ and $f_B$ of FIG. 6A or FIG. 6B. Alternatively, the additional reference data may be $f_A$ of FIG. 6A and $f_B$ of FIG. 6B or may be $f_B$ of FIG. 6A and $f_A$ of FIG. 6B. In addition, the difference between a combination of the first and second gray levels corresponding to the additional reference data may be one.

Referring to FIG. 7, reference data corresponding to the first and second image signals G(n−1) and Gn may be received from the LUT 820 in FIG. 1, and the second image signal Gn may be compensated by interpolation using the reference data. In particular, when the reference data includes two or more pieces of diagonal reference data, the image signal compensation apparatus according to the present exemplary embodiment may compensate the second image signal Gn by quadratic interpolation using additional reference data.

If the reference data received from the LUT 820 is fa, fb, fc, and fd and if a compensation value required to compensate an image signal is F, the compensation value F may be given by Equation (2) or Equation (3) below.

$$F=fa+(2^\alpha-fd+fa)*x+(fd-fa)*y \qquad (2)$$

$$F=fa+(fb-fa)*x+(2^\alpha-fb+fa)*y \qquad (3).$$

Equation (2) or (3) may be used depending on a position defined by a combination of the first and second gray levels of the first and second image signals G(n−1) and Gn. If the position defined by the combination of the first and second gray levels is located in the rising region A, the second image signal Gn may be compensated by triangular bi-linear interpolation using Equation (2). If the position defined by the combination of the first and second gray levels is located in the falling region B, the second image signal Gn may be compensated by triangular bi-linear interpolation using Equation (3). As shown in the drawing, fa, fc, fd, and fe (in the rising region A) or fa, fb, fc, and fe (in the falling region B) may be used.

For more accurate compensation of the second image signal Gn, the image signal compensation apparatus according to the present exemplary embodiment may calculate fe through quadratic interpolation, which uses two or more pieces of diagonal reference data and one or more pieces of additional reference data, and based on the concept of least square approximation.

When the diagonal reference data is represented by $(x_0,f_{00})$ and $(x_2,f_{11})$ while the additional reference data is represented by $(x_1,f_A)$, quadratic interpolation equations for the above data may be defined by $$f_{00}=a+bx_0+cx_0^2$$

$$f_A=a+bx_1+cx_1^2$$

$$f_{11}=a+bx_2+cx_2^2 \qquad (4).$$

The three equations may be rearranged into $$\begin{bmatrix} f_{00} \\ f_A \\ f_{11} \end{bmatrix} = \begin{bmatrix} 1 & x_0 & x_0^2 \\ 1 & x_1 & x_1^2 \\ 1 & x_2 & x_2^2 \end{bmatrix} [a\ b\ c]. \qquad (5)$$

If Equation (5) is simplified to B=AX, since X=A⁻¹B, values of a, b, and c can be calculated. Therefore, if the values of a, b, and c are substituted for Equation (5), a quadratic equation f(x) passing the above three points may be obtained as follows $$f(x)=a*x^2+b*x+c \qquad (6).$$

Since the image signal compensation apparatus according to the present exemplary embodiment may compensate each image signal more accurately by using reference data that includes diagonal reference data and additional reference data, it may enhance the display quality of a display device. Furthermore, the image signal compensation apparatus according to the present exemplary embodiment may store the above a, b, and c parameters calculated using the above equations and compensate each image signal using the stored parameters.

Figure 8:
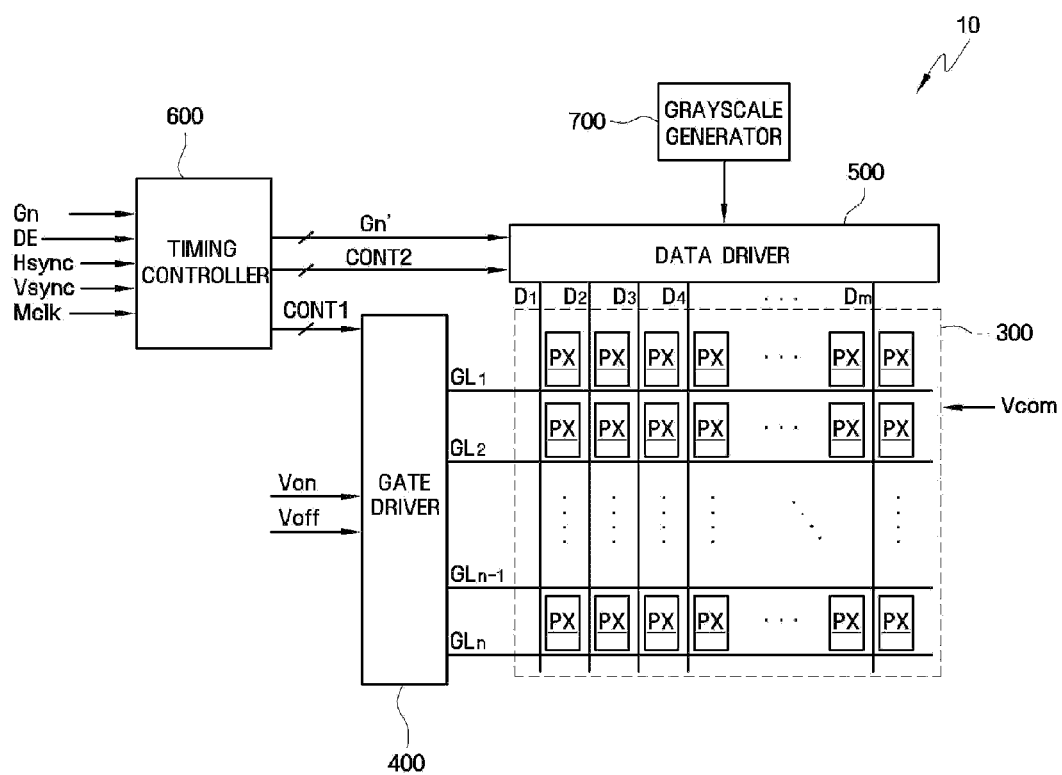
FIG. 8 is a block diagram showing a liquid crystal display (LCD) according to an exemplary embodiment of the present invention.
Figure 9:
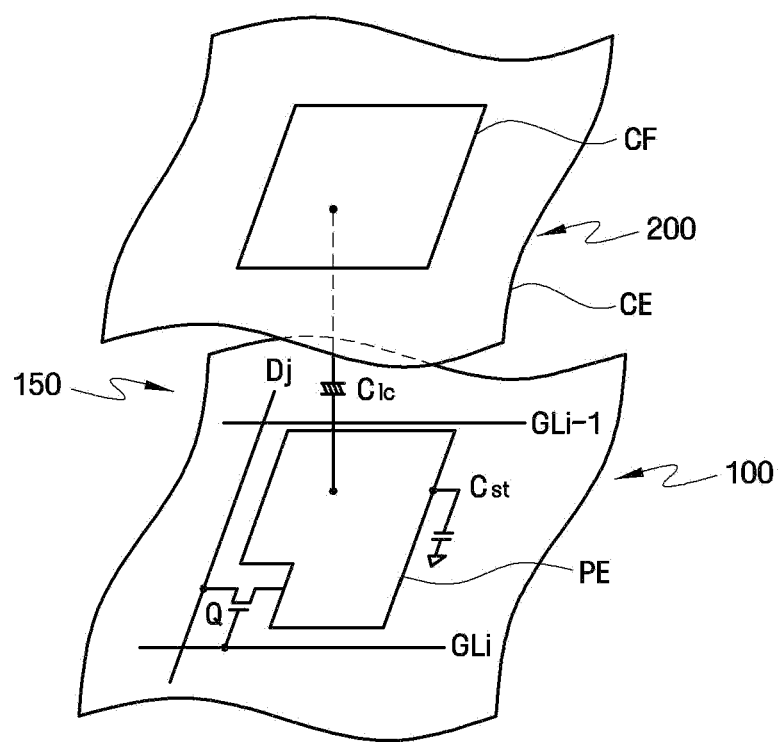
FIG. 9 is an equivalent circuit diagram of a pixel included in the LCD of FIG. 8.

Hereinafter, a liquid crystal display (LCD) according to an exemplary embodiment of the present invention will be described with reference to FIG. 8 and FIG. 9. FIG. 8 is a block diagram for explaining an LCD 10 according to an exemplary embodiment of the present invention. FIG. 9 is an equivalent circuit diagram of a pixel PX included in the LCD 10 of FIG. 8.

Referring to FIG. 8 and FIG. 9, the LCD 10 according to the present exemplary embodiment includes a liquid crystal panel 300, a gate driver 400, and a data driver 500 that are connected to the liquid crystal panel 300, a grayscale generator 700 that is connected to the data driver 500, and a timing controller 600 that controls the above elements.

An equivalent circuit of the liquid crystal panel 300 includes a plurality of display signal lines and a plurality of pixels PX that are connected to the display signal lines and arranged in a matrix. That is, the liquid crystal panel 300 is divided into a plurality of display regions, and each display region includes a plurality of pixels PX. The display signal lines include a plurality of gate lines GL1 through GLn that transmit gate signals, and a plurality of data lines D1 through Dm that transmit data signals. The gate lines GL1 through GLn extend substantially in a row direction to be almost parallel to each other, and the data lines D1 through Dm extend substantially in a column direction to be almost parallel to each other.

The gate driver 400 sequentially outputs a gate-on voltage Von and a gate-off voltage Voff, which are provided by a voltage generator (not shown) to the gate lines GL1 through GLn in response to a gate control signal CONT1 received from the timing controller 600.

The data driver 500 receives a data control signal CONT2 and image data Gn' from the timing controller 600, selects a grayscale voltage corresponding to the image data Gn', and provides the selected grayscale voltage to each data line D1 through Dm.

The gate control signal CONT1 is used to control the operation of the gate driver 400 and may include a vertical start signal to initiate the operation of the gate driver 400, a gate clock signal to determine an output time of the gate-on voltage Von, and an output enable signal to determine a pulse width of the gate-on voltage Von. The data control signal CONT2 is used to control the operation of the data driver 500 and may include a horizontal start signal to start the data driver 500 and an output instruction signal to instruct the output of an image data signal.

The timing controller 600 receives an image signal Gn, which includes red (R), green (G) and blue (B) signals (not shown), and a plurality of external clock signals to control the display of the R, G, and B signals R, G, and B from an external graphic controller (not shown). The external clock signals include a data enable signal DE, a vertical synchronization signal Vsync, a horizontal synchronization signal Hsync, and a main clock Mclk. The data enable signal DE is maintained at a high level during a section in which the R, G, and B signals R, G, and B are input and thus indicates that the R, G, and B signals R, G, and B are being received from the external graphic controller. The vertical synchronization signal Vsync is used to inform the start of a frame, and the horizontal synchronization signal Hsync is used to identify a gate line. The main clock signal Mclk is a clock signal with which all signals required to operate the LCD 10 are synchronized.

The timing controller 600 receives original image signals, i.e., the R, G, and B signals R, G, and B, to display an image on the liquid crystal panel 300, generates the image data Gn' corresponding to the original image signals, and provides the generated image data Gn' to the data driver 500. In addition, the timing controller 600 generates internal clock signals, that is, the gate control signal CONT1 and the data control signal CONT2, based on the received external clock signals and outputs the generated internal clock signals.

The timing controller 600 may include a LUT and an image signal compensation unit. The LUT includes reference data which corresponds to each combination of first and second reference gray levels and is arranged in a matrix, wherein at least one diagonal reference data from among diagonal reference data located on a diagonal line in the matrix has a different value from a corresponding combination of the first and second reference gray levels. The image signal compensation unit receives reference data, which corresponds to each combination of the first and second reference gray levels of first and second image signals, from the LUT and compensates the second image signal using the reference data.

The LUT of the timing controller 600 is substantially identical to those of the image signal compensation apparatuses according to the exemplary embodiments of the present invention in that the LUT includes reference data and that the reference data includes diagonal reference data and/or additional reference data. Thus, a detailed description of the LUT will be omitted.

Referring to FIG. 9, a pixel PX of the liquid crystal panel 300 includes a liquid crystal capacitor Clc and a storage capacitor Cst. The liquid crystal capacitor Clc may include a pixel electrode PE formed on a first display substrate 100, a common electrode CE formed on a second display substrate 200, and a liquid crystal layer 150 interposed between the pixel electrode PE and the common electrode CE. A color filter CF may be formed on a portion of the second display substrate 200. A switching device Q may be connected to an $i^{th}$ gate line Gi (i=1 to n) and a $j^{th}$ data line Dj (j=1 to m) and may provide a data voltage to the liquid crystal capacitor Clc. When necessary, the storage capacitor Cst may be omitted.

A common voltage Vcom provided by a common voltage generator (not shown) is applied to the common electrode CE, and a data voltage provided by the data driver 500 is applied to the pixel electrode PE via each data line D1 through Dm. The liquid crystal capacitor Clc may be charged with a difference between the common voltage Vcom and the data voltage to display an image.

The LCD 10 according to the present exemplary embodiment may have enhanced display quality since it may compensate each image signal more accurately.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An image signal compensation apparatus, comprising:
   a memory configured to store a lookup table (LUT) comprising reference data that corresponds to each combination of first reference gray levels and second reference gray levels; and
   a processor configured to receive a first image signal, a second image signal, and the reference data corresponding to the first image signal and the second image signal from the LUT, and to compensate the second image signal using the reference data,
   wherein the first reference gray levels and the second reference gray levels comprise normal gray levels and at least one shift gray level, the normal gray levels being arranged at a same interval, and the at least one shift gray level being arranged between neighboring normal gray levels,
   wherein a difference between the at least one shift gray level and a neighboring normal gray level of the neighboring normal gray levels is less than the same interval,
   wherein the reference data comprises first reference data and second reference data,
   wherein the first reference data corresponds to combination of the normal gray levels from the first reference gray levels and the second reference gray levels, and
   wherein the second reference data corresponds to combination of the at least one shift gray level and at least some of the normal gray levels from the first reference gray levels and the second reference gray levels.

2. The apparatus of claim 1, wherein the normal gray levels of the first reference gray levels and the normal gray levels of the second reference gray levels have same values.

3. The apparatus of claim 1, wherein a difference between the first reference gray level and the second reference gray level corresponding to the second reference data is smaller than the same interval.

4. The apparatus of claim 3, wherein the first reference gray level and the second reference gray level corresponding to the second reference data have different values, respectively.

5. The apparatus of claim 4, wherein:
   the reference data is arranged in a matrix; and
   the second reference data is disposed in the matrix instead of data corresponding to at least one combination of normal reference values from the first reference gray levels and the second reference gray levels having same values.

6. The apparatus of claim 1, wherein a value of the reference data is a measured value for a combination of the first reference gray levels and the second reference gray levels.

7. The apparatus of claim 1, wherein the first reference gray levels and the second reference gray levels correspond to upper bits of the first image signal and the second image signal, respectively.

8. The apparatus of claim 1, wherein a value of the reference data is a dynamic capacitance compensation (DCC) value corresponding to a combination of the first reference gray levels and the second reference gray levels.

9. The apparatus of claim 1, wherein the second reference data further comprises additional reference data corresponding to combination of a shift gray level of the first reference data and a shift gray level of the second reference data.

10. The apparatus of claim 1, wherein:
the LUT comprises a rising region where the first gray levels are lower than the corresponding second gray levels, and a falling region where the first gray levels are higher than the corresponding second gray levels; and
the second reference data belongs to the rising region or the falling region.

11. The apparatus of claim 1, wherein the processor is configured to compensate the second image signal via bi-linear interpolation or triangular bi-linear interpolation.

12. A liquid crystal display (LCD), comprising:
a liquid crystal panel configured to display an image;
a timing controller configured to receive a first image signal and a second image signal that are sequentially provided and to output a compensated image signal obtained by compensating the second image signal; and
a data driver configured to receive the compensated image signal and to apply a data voltage corresponding to the compensated image signal to the liquid crystal panel,
wherein the timing controller comprises:
a memory configured to store a lookup table (LUT) comprising reference data that corresponds to each combination of first reference gray levels and second reference gray levels; and
a processor configured to receive the first image signal, the second image signal, and the reference data corresponding to the first image signal and the second image signal from the LUT, and to compensate the second image signal using the reference data,
wherein the first reference gray levels and the second reference gray levels comprise normal gray levels and at least one shift gray level, the normal gray levels being arranged at a same interval, and the at least one shift gray level being arranged between neighboring normal gray levels,
wherein a difference between the at least one shift gray level and a neighboring normal gray level of the neighboring normal gray levels is less than the same interval,
wherein the reference data comprises first reference data and second reference data,
wherein the first reference data corresponds to combination of the normal gray levels from the first reference gray levels and the second reference gray levels, and
wherein the second reference data corresponds to combination of the at least one shift gray level and at least some of the normal gray levels from the first reference gray levels and the second reference gray levels.

13. The LCD of claim 12, wherein the normal gray levels of the first reference gray levels and the normal gray levels of the second reference gray levels have same values.

14. The LCD of claim 12, wherein a difference between the first reference gray level and the second reference gray level corresponding to the second reference data is smaller than the same interval.

15. The LCD of claim 14, wherein the first reference gray level and the second reference gray level corresponding to the second reference data have different values, respectively.

16. The LCD of claim 15, wherein:
the reference data is arranged in a matrix; and
the second reference data is disposed in the matrix instead of data corresponding to at least one combination of normal reference values from the first reference gray levels and the second reference gray levels having same values.

17. The LCD of claim 12, wherein a value of the reference data is a measured value for a combination of the first reference gray levels and the second reference gray levels.

18. The LCD of claim 12, wherein the first reference gray levels and the second reference gray levels correspond to upper bits of the first image signal and the second image signal, respectively.

19. The LCD of claim 12, wherein a value of the reference data is a dynamic capacitance compensation (DCC) value corresponding to a combination of the first reference gray levels and the second reference gray levels.

20. The LCD of claim 12, wherein the second reference data further comprises additional reference data corresponding to combination of a shift gray level of the first reference data and a shift gray level of the second reference data.

21. The LCD of claim 12, wherein:
the LUT comprises a rising region where the first gray levels are lower than the corresponding second gray levels, and a falling region where the first gray levels are higher than the corresponding second gray levels; and
the second reference data belongs to the rising region or the falling region.

22. The LCD of claim 12, wherein the processor is configured to compensate the second image signal via bi-linear interpolation or triangular bi-linear interpolation.

23. The LCD of claim 12, wherein the normal gray levels of the first reference gray levels and the normal gray levels of the second reference gray levels have same values.

* * * * *